United States Patent
Lu et al.

(10) Patent No.: US 9,613,229 B2
(45) Date of Patent: Apr. 4, 2017

(54) METHOD FOR GENERATING COORDINATE POINT IN EMBEDDED SYSTEM

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/423,465

(22) PCT Filed: Nov. 27, 2013

(86) PCT No.: PCT/CN2013/087924
§ 371 (c)(1),
(2) Date: Feb. 24, 2015

(87) PCT Pub. No.: WO2014/101613
PCT Pub. Date: Jul. 3, 2014

(65) Prior Publication Data
US 2016/0012253 A1   Jan. 14, 2016

(30) Foreign Application Priority Data

Dec. 28, 2012 (CN) .......................... 2012 1 0587204

(51) Int. Cl.
*H04L 29/06* (2006.01)
*G06F 21/00* (2013.01)
(Continued)

(52) U.S. Cl.
CPC ............ *G06F 21/71* (2013.01); *G06F 21/602* (2013.01); *H04L 9/3066* (2013.01)

(58) Field of Classification Search
CPC ....... G06F 21/71; G06F 21/602; H04L 9/3066
See application file for complete search history.

(56) References Cited

U.S. PATENT DOCUMENTS 6,633,896 B1 * 10/2003 Moore .................. G06F 7/5324
708/620
9,166,902 B1 * 10/2015 Mandakolathur ....... H04L 45/16
(Continued)

*Primary Examiner* — Lisa Lewis
(74) *Attorney, Agent, or Firm* — Hammer & Associates, P.C.

(57) ABSTRACT

A method for generating a coordinate point in an embedded system comprises the following steps: obtaining a random number and a first fixed value, and performing a modulo operation on the random number by using the first fixed value as a modulus, so as to obtain first data; selecting each data bit from the first data; obtaining, according to a position of the selected data bit in the first data, an initial point value corresponding to the selected data bit from a pre-stored initial point value list when data in the selected data bit is not zero; and performing a point adding operation on the obtained initial point value and an intermediate point value, and outputting the obtained operation result as result data. In the present invention, by querying in a preset initial point value list, an initial point value in the initial point value list is obtained, and calculation is performed according to the initial point value, thereby greatly improving the speed of generating a coordinate point.

10 Claims, 7 Drawing Sheets

(51) Int. Cl.
G06F 21/71 (2013.01)
H04L 9/30 (2006.01)
G06F 21/60 (2013.01)

(56) References Cited

U.S. PATENT DOCUMENTS

2002/0169971 A1* 11/2002 Asano .................. G06F 21/10
 713/193
2004/0096057 A1* 5/2004 Moore .................. G06F 7/728
 380/28
2006/0224817 A1* 10/2006 Atri .................... G06F 12/0246
 711/103

* cited by examiner

METHOD FOR GENERATING COORDINATE POINT IN EMBEDDED SYSTEM

TECHNICAL FIELD

The present invention relates to the cryptology field, especially related to a method for generating coordinate points in an embedded system.

PRIOR ART

With the development of science technology, data security is required to be higher and higher. In the prior art, the implementing way for protecting data security includes encrypting and signing, etc. However, both encrypting process and signing process require participation of key. In a process of generating key, the data volume is big, the speed of operation is slow, which makes implementing efficiency of the encrypting process and signing process be very low.

SUMMARY OF THE INVENTION

The object of the present invention is to provide a method for generating coordinate points in an embedded system, which solves defection of low operation speed for generating coordinate point in the prior art.

Therefore, according to the first aspect of the present invention, the present invention provides a method for generating coordinate points in an embedded system, which comprises following steps:

S1, obtaining a random number and a first fixed value, taking the first fixed value as modulus and performing modular operation on the random number to obtain a first data;

S2, selecting an unprocessed data bit from the first data;

S3, obtaining an initial point value corresponding to the selected data bit from a pre-stored initial point value table according to the position of the selected data bit in the first data; respective initial point values in the initial point value table are operation results of performing point multiplication operation respectively on different power values and a preset first point value;

S4, performing point multiplication on the obtained initial point value and the data in the selected data bit; performing point add operation on the obtained point multiplication result and a mid-point value to obtain point add operation result; and updating the mid-point value with the point add operation result; the initial point value of the mid-point value is (0,0);

S5, determining whether an unprocessed data bit exists in the first data, if yes, going back to Step S2; otherwise, going to Step S6; and S6, outputting the mid-point value as result data.

According to the second aspect of the present invention, the present invention provides a method for generating coordinate points in an embedded system, which comprises following steps:

S1, obtaining a random number and a first fixed value, taking the first fixed value as modulus and performing modular operation on the random number to obtain a first data;

S2, selecting an unprocessed data bit from the first data;

S3, determining whether the data in the selected data bit is zero, if yes, going to Step S6; otherwise, going to Step S4;

S4, obtaining an initial point value corresponding to the selected data from the prestored initial point value table according to the position of the first data in the selected data bit; respective initial point values in the initial point value table are operation results of performing point multiplication operation respectively on different power values and a preset first point value;

S5, performing point add operation on the obtained initial point value and a mid-point value to obtain a point add operation result and update the mid-point value with the point add operation result; the initial value of the mid-point value is (0,0);

S6, determining whether an unprocessed data bit exists in the first data, if yes, going back to Step S2; otherwise, going to Step S7;

S7, taking the mid-point value as result data for output.

According to the third aspect of the present invention, the present invention provides a method for generating coordinate points in an embedded system, which comprises following steps:

S1, obtaining a random number and a first fixed value, taking the first fixed value as modulus, performing modular operation on the random number to obtain a first data;

S2, performing modular operation for a reminder on the bit length of the first data according to preset packet length and obtaining a second data;

S3, determining whether the second data is zero, if yes, going to Step S5; otherwise, going to Step S4;

S4, padding zero to the high bit of the first data; going back to Step S2;

S5, dividing the first data into packets according to the preset packet length to obtain a plurality of packets; and S6, selecting an unprocessed packet from the first data;

S7, obtaining an initial point value corresponding to the selected packet from a pre-stored initial point value table according to the position of the selected packet in the first data; respective initial point values in the initial point value table are operation results of performing point multiplication operation respectively on different power values and a preset first point value;

S8, performing point multiplication on the obtained initial point value and the data in the selected data bit; performing point add operation on the obtained point multiplication result and a mid-point value to obtain point add operation result; and updating the mid-point value with the point add operation result; the initial point value of the mid-point value is (0,0);

S9, determining whether an unprocessed packet exists in the first data, if yes, going back to Step S6; otherwise, going to Step S10; and S10, taking the mid-point value as result data for outputting.

According to the fourth aspect of the present invention, the present invention provides a method for generating coordinate points in an embedded system, which comprises following steps:

S1, obtaining a random number and a first fixed value, taking the first fixed value as modulus, performing modular operation on the random number to obtain a first data;

S2, performing modular operation for a reminder on the bit length of the first data according to preset packet length and obtaining a second data;

S3, determining whether the second data is zero, if yes, going to Step S5; otherwise, going to Step S4;

S4, padding zero to the high bit of the first data; going back to Step S2;

S5, dividing the first data into packets according to the preset packet length to obtain a plurality of packets;

S6, selecting an unprocessed packet from the first data;

S7, determining whether the data in the selected packet is zero, if yes, going to Step S10; otherwise, going to Step S8;

S8, obtaining an initial point value corresponding to the selected packet from a pre-stored initial point value table according to the position of the selected packet in the first data and the data in the selected packet; respective initial point values in the initial point value table are operation results of performing point multiplication operation respectively on different power values, different indexes and a preset first point value;

S9, taking the second fixed value as modulus and performing point add operation on the obtained point multiplication result and a mid-point value to obtain point add operation result; and updating the mid-point value with the point add operation result; the initial point value of the mid-point value is (0,0);

S10, determining whether an unprocessed packet exists in the first data, if yes, going back to Step S6; otherwise, going to Step S11; and S11, taking the mid-point value as result data for outputting.

The advantages of the present invention include: obtaining initial point value in an initial point value table by searching a preset initial point value table and performing computation according to the initial point value improves operation speed of generating coordinate points greatly.

BRIEF DESCRIPTION OF THE ACCOMPANYING DRAWINGS

DETAILED DESCRIPTION OF THE PRESENT INVENTION

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those skilled in the art without any creative work belong to the scope of the disclosure.

Embodiment 1

Figure 1:
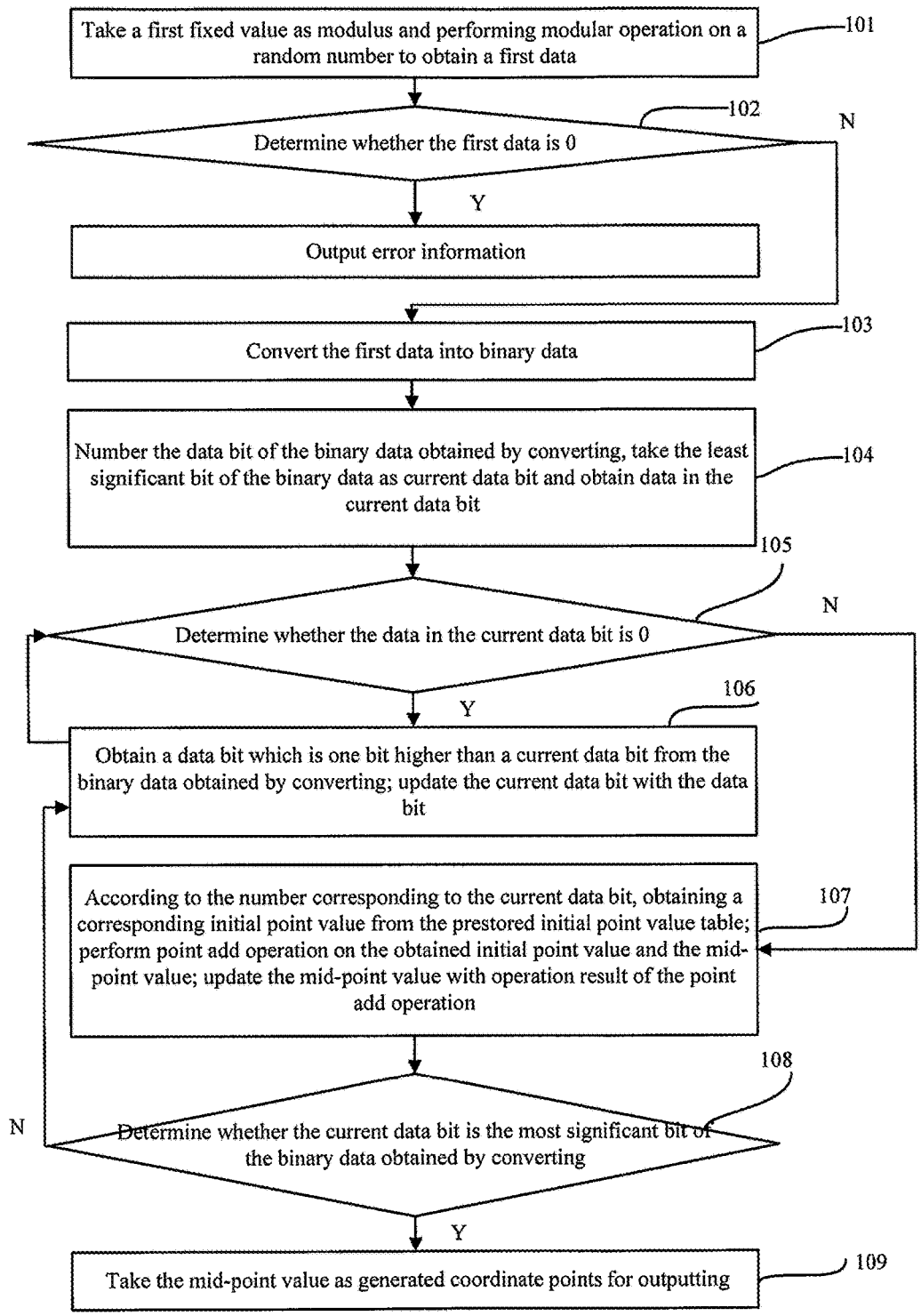
FIG. 1 is a flow chart of a method for generating coordinate points in an embedded system of Embodiment 1 of the present invention.

Embodiment 1 of the present invention provides a method for generating coordinate points in an embedded system. By searching a pre-stored initial point value table, a matched initial point value is obtained from the initial point value table and computing is performed according to the initial point value in the method. As shown by FIG. 1, the process of the method includes following steps:

Step 101, taking a first fixed value as modulus and performing modular operation on a random number to obtain a first data;

Preferably, before Step 101, the method further includes generating random number k and obtaining a first fixed value n;

Step 102, determining whether the first data is 0, if yes, outputting error information; otherwise, going to Step 103;

In other embodiments of the present invention, if the first data is 0, a random number can be generated and then going back to Step 101;

Step 103, converting the first data into binary data; in Embodiment 1, if the first data is 372, converting the first data into corresponding binary data with 9 bits 101110100, i.e. the data bit length of the first data is 9;

It should be noted that Step 103 is a preferable step; when the first data is binary data, the first data is not required to be converted into binary data, which can implement the invention purpose of the present invention.

Step 104, numbering the data bit of the binary data obtained by converting, taking the least significant bit of the binary data as current data bit and obtaining data in the current data bit;

In Embodiment 1, numbering the data bits of the binary data obtained by converting the first data from 0 according to order from low bit to high bit; for example, converting the first data into binary data with 9 bits 101110100; the data bit length is 9; numbering the data bits from 0; the maximum number is 8; the number of the most significant bit is 8; the number of the least significant bit is 0; the current data bit is the least significant bit; the data in the current data bit is 0;

Step 105, determining whether the data in the current data bit is 0, if yes, going to Step 106; otherwise, going to Step 107;

Step 106, obtaining a data bit which is one bit higher than a current data bit from the binary data obtained by converting; updating the current data bit with the data bit; going back to Step 105;

Step 107, according to the number corresponding to the current data bit, obtaining a corresponding initial point value from the pre-stored initial point value table; performing point add operation on the obtained initial point value and the mid-point value; updating the mid-point value with operation result of the point add operation;

In this step, the initial point value of the mid-point value is (0,0); the initial point value table includes a plurality of numbers and the initial point value corresponding to the number; the initial point value corresponding to the number with value of i is $2^i \times G(x, y)$; $G(x, y)$ is a preset first point value; when the number is 0, the corresponding point value is $2^0 \times G(x, y)$; when the number is 1, the corresponding initial point value is $2^1 \times G(x, y)$; when the binary data obtained by conversing the first data is 101110100 and the number corresponding to the current data bit is 2, the obtained corresponding initial point value is $G_2=2^2 \times G(x, y)$; the mid-point value is (0,0); then the operation result of the performing point add operation on the initial point value and the mid-point value is $2^2 \times G(x,y)$; updating the mid-point value to be $2^2 \times G(x, y)$;

Operation of generating the initial point value table specifically includes: generating a plurality of consecutive integers according to a preset bit length; the minimum value of the number is zero; performing computing by taking 2 as base and taking respective integers as exponents to obtain power values corresponding to respective integers; performing point multiplication operation on the power values corresponding to respective integers and the first point value to obtain initial point values corresponding to the numbers and generating the initial point value table according to respective numbers and the initial point values corresponding to respective numbers.

For example, when the preset bit length is 9, the generated numbers are 8, 7, 6, 5, 4, 3, 2, 1 and 0; then corresponding power values respectively are $2^8, 2^7, 2^6, 2^5, 2^4, 2^3, 2^2, 2^1$ and $2^0$; the initial point values obtained after point multiplication respectively are $G_8=2^8 \times G(x,y)$, $G_7=2^7 \times G(x, y)$, $G_6=2^6 \times G(x, y)$, $G_5=2^5 \times G(x, y)$, $G_4=2^4 \times G(x, y)$, $G_3=2^3 \times G(x, y)$, $G_2=2^2 \times G(x, y)$, $G_1=2^1 \times G(x, y)$ and $G_0=2^0 \times G(x, y)$; the generated initial point value table is shown as FIG. 1:

TABLE 1

Example 1 of an initial point value table

| Number | 8 | 7 | 6 | 5 | 4 | 3 | 2 | 1 | 0 |
|---|---|---|---|---|---|---|---|---|---|
| Initial point value | $G_8$ | $G_7$ | $G_6$ | $G_5$ | $G_4$ | $G_3$ | $G_2$ | $G_1$ | $G_0$ |

Step 108, determining whether the current data bit is the most significant bit of the binary data obtained by converting, if yes, going to Step 109; otherwise, going back to Step 106;

Step 109, taking the mid-point value as generated coordinate points for outputting;

For example, when the binary data obtained by converting the first data is 101110100, the obtained initial point values are respectively the initial point values corresponding to the data bits which are numbered 2, 4, 5, 6 and 8, i.e. $G_8=2^8 \times G(x, y)$, $G_6=2^6 \times G(x, y)$, $G_5=2^5 \times G(x, y)$, $G_4=2^4 \times G(x, y)$, $G_2=2^2 \times G(x, y)$; after performing point add operation according to above initial point values, obtaining the midpoint value $Q=1 \times 2^8 \times G(x, y)+1 \times 2^6 \times G(x,y)+1 \times 2^5 \times G(x, y)+1 \times 2^4 \times G(x, y)+1 \times 2^2 \times G(x, y)$.

In Embodiment 1 of the present invention, by searching the prestored initial point value table, obtaining the initial point values in the initial point value table and performing operation according to the initial point value, which highly improves operation speed.

Figure 2:
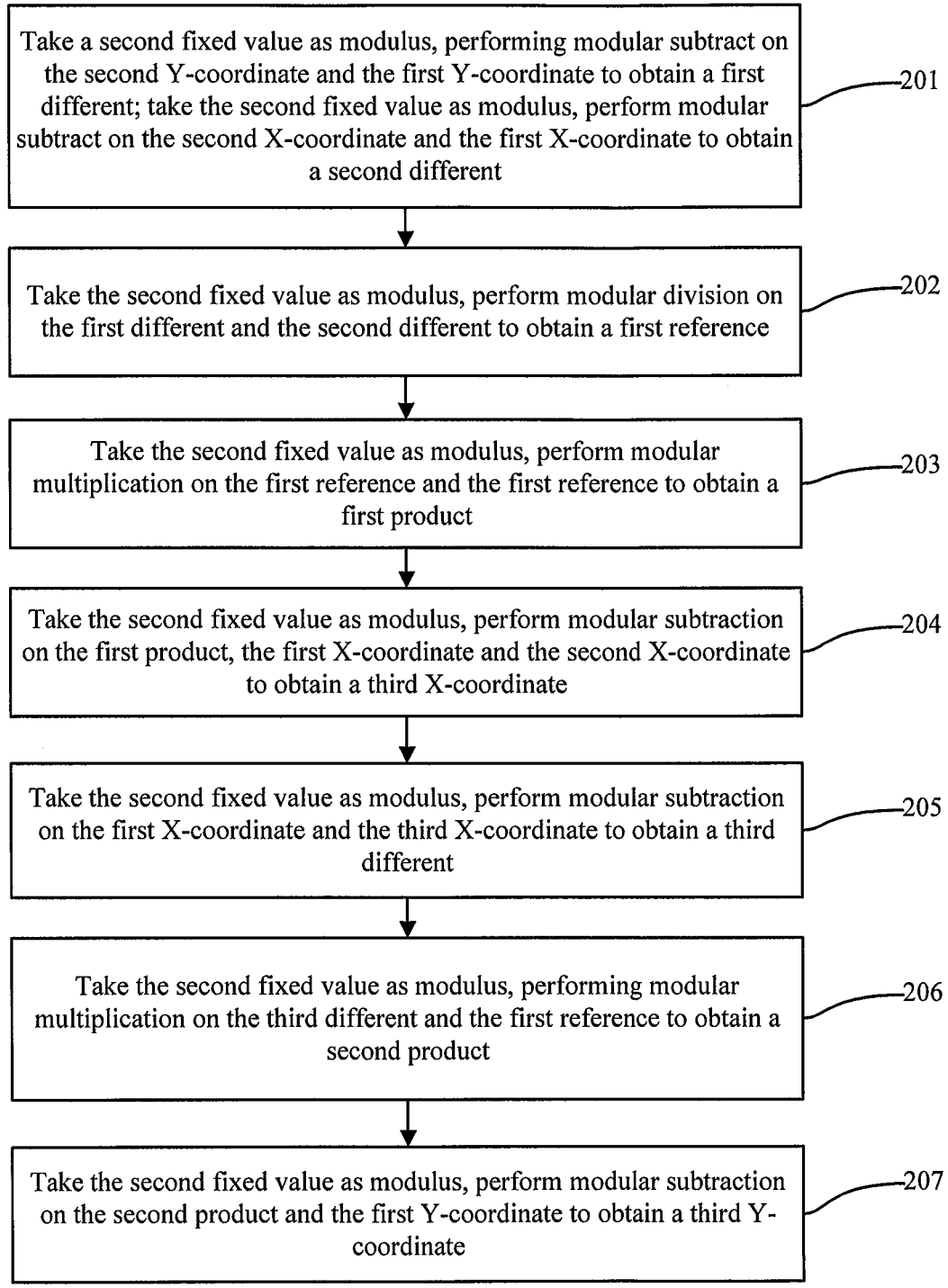
FIG. 2 is a flow chart of a method for performing point add operation on an initial point value and a mid-point value in Embodiment 1 of the present invention.

In Step 107 of Embodiment 1, a process of performing point add operation on the initial point value (a first X-coordinate, a second Y-coordinate) and a mid-point value (a second Y-coordinate, a second X-coordinate) to obtain operation result of the point add operation (a third-coordination, a third Y-coordinates), as shown by FIG. 2, includes following steps:

Step 201, taking a second fixed value as modulus, performing modular subtraction on the second Y-coordinate and the first Y-coordinate to obtain a first different; taking the second fixed value as modulus, performing modular subtraction on the second X-coordinate and the first X-coordinate to obtain a second different;

Step 202, taking the second fixed value as modulus, performing modular division on the first different and the second different to obtain a first reference;

Step 203, taking the second fixed value as modulus, performing modular multiplication on the first reference and the first reference to obtain a first product;

Step 204, taking the second fixed value as modulus, performing modular subtraction on the first product, the first X-coordinate and the second X-coordinate to obtain a third X-coordinate;

Step 205, taking the second fixed value as modulus, performing modular subtraction on the first X-coordinate and the third X-coordinate to obtain a third different;

Step 206, taking the second fixed value as modulus, performing modular multiplication on the third different and the first reference to obtain a second product;

Step 207, taking the second fixed value as modulus, performing modular subtraction on the second product and the first Y-coordinate to obtain a third Y-coordinate;

In other embodiments of the present invention, taking the most significant bit of binary data obtained by converting as current data bit, obtaining data in the current data bit and determining whether the data in the current data bit is 0, if yes, obtaining a data bit which is one bit lower than the current data bit from the binary data obtained by converting, updating the current data bit with the data bit and keeping on determining whether data in the current data bit is 0 and performing subsequent operation; otherwise, obtaining a corresponding initial point value from the pre-stored initial point value table according to the number corresponding to the current data bit, performing point add operation on the obtained initial point value and a mid-point value, updating the mid-point value with result of the point add operation and determining whether the current data is the least significant bit of the binary data obtained by converting, if yes, taking the mid-point value as generated coordinated points for outputting; otherwise, obtaining a data bit which is one bit lower than the current data bit from the binary data obtained by converting; updating the current data bit as the data bit and keeping determining whether data in the current data bit is 0 and performing subsequent operation. The above process can realize the invention purpose of the present invention as well.

In other embodiments of the present invention, without determining whether data in the current data bit is 0, obtaining the initial point value corresponding to the current data bit directly from the initial point value, performing point multiplication on the obtained initial point value and the data in the current data bit and performing point add operation according to the obtained point multiplication result; for detailed process, please refer to Embodiment 2.

Embodiment 2

Embodiment 2 provides a method for generating coordinate points in an embedded system. As shown by FIG. 2, the method provides following steps:

Step 301, generating a plurality of numbers with consecutive values according to a preset bit length;

In this case, the number with minimum value is zero; for example, the preset bit length is 9 bits, the generated numbers are respectively 8, 7, 6, 5, 4, 3, 2, 1 and 0;

Step 302, performing computing by taking 2 as base and taking respective numbers as exponent to obtain power values corresponding to the respective numbers;

For example, when the numbers are 8, 7, 6, 5, 4, 3, 2, 1 and 0, the corresponding power values are respectively $2^8$, $2^7$, $2^6$, $2^5$, $2^4$, $2^3$, $2^2$, $2^1$ and $2^0$;

Step 303, performing point multiplication on the power values corresponding to the numbers and the first point value respectively to obtain initial point values corresponding to the numbers; generating an initial point value table according to respective numbers and the initial point values corresponding to the respective number;

In this case, the initial point value table includes a plurality of numbers and the initial point values corresponding to the numbers; the initial point value corresponding to the number with value of i is $2^i \times G(x, y)$; $G(x, y)$ is a preset first point value; in Embodiment 2, it can obtain a point from a preset elliptic curve and take the coordinates of the point as a first point value; i.e. Gx=32C4AE2C1F1981195F9904466A39C9948FE30BBFF2660BE1715A4589334C74C7, Gy=BC3736A2F4F6779C59BDCEE36B692153D0A9877CC62A474002DF32E52139F0A0;

For example, when the power values corresponding to numbers are respectively $2^8, 2^7, 2^6, 2^5, 2^4, 2^3, 2^2, 2^1$ and $2^0$, the obtained initial point values are respectively $G_8=2^8 \times G(x, y)$, $G_7=2^7 \times G(x, y)$, $G_6=2^6 \times G(x, y)$, $G_5=2^5 \times G(x, y)$, $G_4=2^4 \times G(x, y)$, $G_3=2^3 \times G(x, y)$, $G_2=2^2 \times G(x, y)$, $G_1=2^1 \times G(x, y)$ and $G_0=2^0 \times G(x, y)$; for the generated initial point value table, please refer to FIG. 1;

Step 304, taking the first fixed value as modulus and performing modular operation on a random number to obtain a first data;

For example, the first fixed value is n, the random number is k; then the first data is k mod n; in Embodiment 1, the random k is CBD23F983A50133A2A45AD29A59271FD7CA671C1894C D49D7171416545EF698B; therefore, the value of the first fixed value n can be determined according to the predefined elliptic curve, i.e. the n is FFFFFFFFEFFFFFFFFFFFFFFFFFFFFFF7203DF6B21C6052B53BBF40939D54123;

Step 305, determining whether the first data is 0, if yes, outputting error information; otherwise, going to Step 306;

Step 306, converting the first data into binary data;

It should be noted that step 306 is preferable step; when the first data is binary data, the invention purpose of the present invention can be implemented without converting the first data into binary data Step 307, numbering the data bit of the binary data obtained by converting, taking the least significant bit of the binary data as current data bit and obtaining the data in the current data bit;

In Embodiment 2, numbering the data bit of the binary data obtained by converting the first data according to the order from low bit to high bit, i.e. by starting from 0;

Step 308, obtaining corresponding initial point value from the initial point value table according to the number corresponding to the current data bit;

For example, if the number corresponding to the current data bit is 2, the obtained corresponding initial point value is $G_2=2^2 \times G(x,y)$;

Step 309, performing point multiplication on the obtained initial point value and the data in the current data bit, performing point add operation on the obtained point multiplication result and the mid-point value and updating the mid-point value with the result of the point add operation;

In this case, the initial point value of the mid-point value is (0, 0); if the number corresponding to the current data bit is 2, the obtained corresponding initial point value is $G_2=2^2 \times G(x, y)$; performing point multiplication on the initial point value and the data in the current data bit to obtain point multiplication result $1 \times 2^2 \times G(x, y)$; performing point add operation on the point multiplication result and the mid-point value (0,0) to obtain the updated mid-point value $2^2 \times G(x, y)$;

For detailed process of performing point add operation on the point multiplication result and the mid-point value, please refer to Step 201 to Step 207 in FIG. 2.

Step 310, determining whether the current data bit is the most significant bit of the binary data obtained by converting; if yes, going to Step 312; otherwise, going to Step 311;

Step 311, obtaining a data bit which is one bit higher than the current data bit and updating the current data bit with the data bit; going back to Step 308;

Step 312, taking the mid-point value as generated coordinate points for outputting; For example, if the binary data obtained by converting the first data is 101110100, the obtained mid-point value is $Q=1 \times 2^8 \times G(x, y)+0 \times 2^7 \times G(x, y)+1 \times 2^6 \times G(x, y)+1 \times 2^5 \times G(x, y)+1 \times 2^4 \times G(x, y)+0 \times 2^3 \times G(x, y)+1 \times 2^2 \times G(x, y)+0 \times 2^1 \times G(x, y)+0 \times 2^0 \times G(x, y)$; if the first fixed value n is FFFFFFFEFFFFFFFFFFFFFFFFFFFFFFFF7203DF6B21C6052B53BBF40939D54123, and the random number k is CBD23F983A50133A2A45AD29A59271FD7CA671C1894CD49D7171416545EF 698B, Gx=32C4AE2C1F1981195F9904466A39C9948FE30BBFF2660BE1715A4589334C74C7, Gy=BC3736A2F4F6779C59BDCEE36B692153D0A9877CC62A474002DF32E521 39F0A0, the obtained mid-point value Q is (C40F1EB984DC0089960C43A60CF7A704BFD2B0A12C95568671B353BF70080F0B, 6BD79C0F790E585E9B89E71EBDB51BD5FA99C8E4F2E5AC853420 507D311405FA).

In Embodiment 2 of the present invention, generating an initial point value table according to the preset bit length and, in the process of generating coordinate points, searching the initial point table to obtain an initial point value from the initial point value table and performing computing according to the initial point value so as to improve operation speed greatly.

In other embodiments of the present invention, it can also divide the binary data obtained by converting the first data, number the obtained packets, search the preset initial point value table according to the number of the packet and the value, obtain the matched initial point value in the initial point value table and perform computing according to the initial point value. For detailed process, please refer to Embodiment 3.

Embodiment 3

Figure 4:
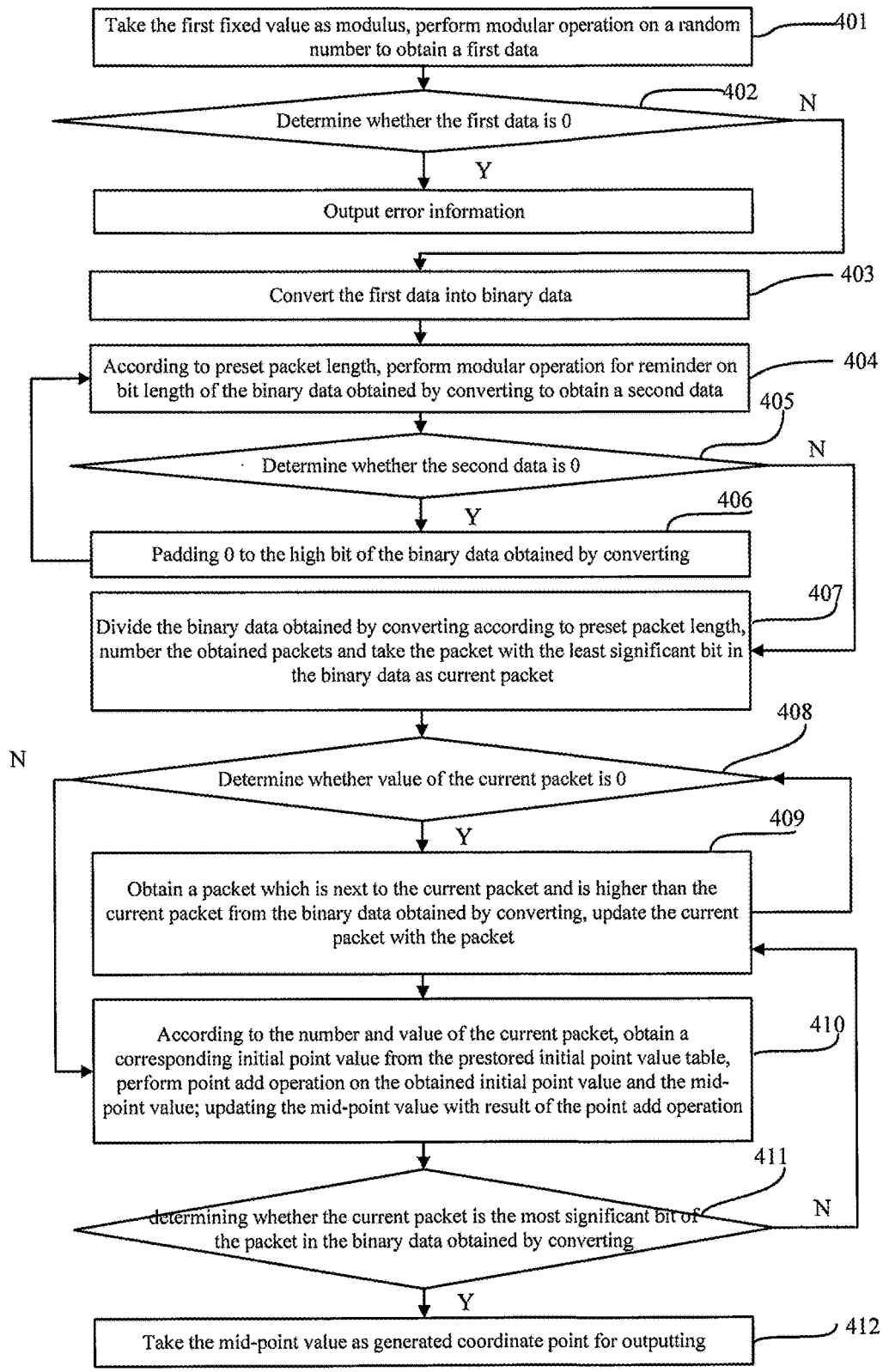
FIG. 4 is a flow chart of a method for generating coordinate points in an embedded system of Embodiment 3 of the present invention.

Embodiment 3 provides a method for generating coordinate points in an embedded system. As shown by FIG. 4, the method includes following steps:

Step 401, taking the first fixed value as modulus, performing modular operation on a random number to obtain a first data;

Step 402, determining whether the first data is 0, if yes, outputting error information; otherwise, going to Step 403;

Step 403, converting the first data into binary data;

It should be noted that Step 403 is a preferable step; when the first data is binary data, the first data is not required to be converted into binary data. The purpose of the present invention can be implemented as well.

Step 404, according to preset packet length, performing modular operation for reminder on bit length of the binary data obtained by converting to obtain a second data;

Step 405, determining whether the second data is 0, if yes, going to Step 407; otherwise, going to Step 406;

In Embodiment 3, if the first data is 372, correspondingly converting the first data into binary data with 9 bits 101110100; if the preset packet length is 2, the second data is 1;

Step 406, padding 0 to the high bit of the binary data obtained by converting, going back to Step 404;

In Embodiment 3, if the preset packet length is 2, the first data is 372; then correspondingly converting the first data into binary data with 9 bits 101110100; performing modular operation on 9 with 2 to obtain a second data 1; padding 0 before 101110100 to obtain binary data with 10 bits 0101110100; performing modular operation on 10 with 2 to obtain second data 0;

Step 407, dividing the binary data obtained by converting according to preset packet length, numbering the obtained packets and taking the packet with the least significant bit in the binary data as current packet;

In Embodiment 3, according to order from low bit to high bit by starting from 0, numbering the packets obtained by dividing the binary data according to preset packet length; in this case, the bit length of packet is preset packet length. For example, the preset packet is 2; the binary data is 0101110100; the packets obtained by dividing are "01", "01", "11", "01" and "00" according to the order from high to low; the corresponding numbers are 4, 3, 2, 1 and 0; taking the packet "00" numbered 0 as current packet;

Step 408, determining whether value of the current packet is 0, if yes, going to Step 409; otherwise, going to Step 410;

Step 409, obtaining a packet which is next to the current packet and is higher than the current packet from the binary data obtained by converting, updating the current packet with the packet, going back to Step 408;

Step 410, according to the number and value of the current packet, obtaining a corresponding initial point value from the pre-stored initial point value table, performing point add operation on the obtained initial point value and the mid-point value; updating the mid-point value with result of the point add operation;

Specifically, it can also search the initial point value table according to the number of the current packet to obtain an index corresponding to the number in the initial point value table, so as to obtain an initial point value corresponding to the index of which the value is equal to the value of the current packet, perform point add operation on the obtained initial point value and the mid-point value and update the mid-point value with the result of the point add operation. For detailed process of performing point add operation on the obtained initial point value, please refer to Step 201 to Step 207 in FIG. 2.

In this case, the initial point value of the mid-point value is (0,0); the initial point value table includes a plurality of numbers, a plurality of indexes corresponding to respective numbers and initial point values corresponding to the respective indexes; the number of the indexes corresponding to each index depends on the preset packet length; when the preset packet length is n, the number of the indexes corresponding to each number is $2^n-1$, which is an integer ranged from 1 to $2^n-1$; the initial point values corresponding to $2^n-1$ indexes corresponding to number i respectively are the point multiplication results of respective indexes and $2^{i*n} \times G(x, y)$, i.e. $1 \times 2^{i*n} \times G(x, y) \ldots (2^n-1) \times 2^{i*n} \times G(x, y)$, $G(x, y)$ is a preset first point value;

For example, the preset packet length is 2, the indexes corresponding to number 0 includes 1, 2 and 3, which correspond to the initial point values $1 \times 2^0 \times G(x, y)$, $2 \times 2^0 \times G(x, y)$ and $3 \times 2^0 \times G(x,y)$; the indexes corresponding to number 1 include 1, 2 and 3, which respectively correspond initial point values $1 \times 2^{1*2} \times G(x, y)$, $2 \times 2^{1*2} \times G(x, y)$ and $3 \times 2^{1*2} \times G(x, y)$; when the binary data obtained by converting the first data is 101110100, the number of the current packet is 1 and the value of the current packet is 01, the obtained initial point value is $G_{1-01}=1 \times 2^{1*2} \times G(x, y)$; if the mid-point value is (0, 0), the result of performing point add operation on the initial point value and mid-point value is $2^2 \times G(x, y)$ and the mid-point value is updated to be $2^2 \times G(x, y)$;

Operation of generating initial point value table can specifically include: generating a plurality of numbers with consecutive values according to preset bit length and preset packet length; generating a plurality of indexes with consecutive values for each number according to the preset packet length; in this case, the number of numbers is ratio of the preset bit length and the preset packet length; the number with the minimum value is 0; the index with the minimum value is 1; performing computing by taking 2 as base and respective numbers as exponents to obtain power values corresponding to respective numbers; performing point multiplication on the power value, the index and the first point value corresponding to the number to obtain initial point value corresponding to the number and the index; generating the initial point value table according to respective numbers, respective indexes corresponding to the numbers and initial point values corresponding to the numbers and indexes.

For example, when the preset bit length is 10 bits and the preset packet length is 2, the generated numbers are respectively 4, 3, 2, 1 and 0; then the corresponding power values are respectively $2^8$, $2^6$, $2^4$, $2^2$ and $2^0$; after performing point multiplication, obtaining initial point values $G_{1-01}=1 \times 2^2 \times G(x, y)$, $G_{1-10}=2 \times 2^2 \times G(x, y)$ and $G_{1-11}=3 \times 2^2 \times G(x, y)$, which are corresponding to the indexes 1, 2 and 3 corresponding to 0; the initial point values $G_{1-01}=1 \times 2^2 \times G(x, y)$, $G_{1-10}=2 \times 2^2 \times G(x, y)$ and $G_{1-11}=3 \times 2^2 \times G(x, y)$, which are corresponding to the indexes 1, 2 and 3 corresponding to number 1; the initial point values $G_{2-01}=1 \times 2^4 \times G(x, y)$, $G_{2-10}=2 \times 2^4 \times G(x, y)$ and $G_{2-11}=3 \times 2^4 \times G(x, y)$, which are corresponding to the indexes 1, 2 and 3 corresponding to 2; the initial point values $G_{3-01}=1 \times 2^6 \times G(x, y)$, $G_{3-10}=2 \times 2^6 \times G(x, y)$ and $G_{3-11}=3 \times 2^6 \times G(x, y)$, which are corresponding to the indexes 1, 2 and 3 corresponding to 3; and the initial point values $G_{4-01}=1 \times 2^8 \times G(x, y)$, $G_{4-10}=2 \times 2^8 \times G(x, y)$ and $G_{4-11}=3 \times 2^8 \times G(x, y)$, which are corresponding to the indexes 1, 2 and 3 corresponding to 4; the generated initial point value table is shown as Table 2.

TABLE 2

Example 2 of the initial point value table

| Number | Index | Initial point value |
|---|---|---|
| 0 | 1 | $G_{0-01} = 1 \times 2^0 \times G(x, y)$ |
|   | 2 | $G_{0-10} = 2 \times 2^0 \times G(x, y)$ |
|   | 3 | $G_{0-11} = 3 \times 2^0 \times G(x, y)$ |
| 1 | 1 | $G_{1-01} = 1 \times 2^2 \times G(x, y)$ |
|   | 2 | $G_{1-10} = 2 \times 2^2 \times G(x, y)$ |
|   | 3 | $G_{1-11} = 3 \times 2^2 \times G(x, y)$ |
| 2 | 1 | $G_{2-01} = 1 \times 2^4 \times G(x, y)$ |
|   | 2 | $G_{2-10} = 2 \times 2^4 \times G(x, y)$ |
|   | 3 | $G_{2-11} = 3 \times 2^4 \times G(x, y)$ |
| 3 | 1 | $G_{3-01} = 1 \times 2^6 \times G(x, y)$ |
|   | 2 | $G_{3-10} = 2 \times 2^6 \times G(x, y)$ |
|   | 3 | $G_{3-11} = 3 \times 2^6 \times G(x, y)$ |
| 4 | 1 | $G_{4-01} = 1 \times 2^8 \times G(x, y)$ |
|   | 2 | $G_{4-10} = 2 \times 2^8 \times G(x, y)$ |
|   | 3 | $G_{4-11} = 3 \times 2^8 \times G(x, y)$ |

Step 411, determining whether the current packet is the most significant bit of the packet in the binary data obtained by converting, if yes, going to Step 412; otherwise, going to Step 409;

Step 412, taking the mid-point value as generated coordinate point for outputting;

For example, when the binary data obtained by converting the first data is 101110100, the packet obtained by dividing is "01", "01", "11", "01" and "00"; the corresponding numbers are respectively 4, 3, 2, 1 and 0; obtaining initial point values corresponding to the packets numbered 4, 3, 2, 1 from the initial point value table; the initial point values are $G_{4\text{-}01}=1\times2^8\times G(x, y)$, $G_{3\text{-}01}=1\times2^6\times G(x, y)$, $G_{2\text{-}11}=3\times2^4\times G(x, y)$ and $G_{1\text{-}01}=1\times2^2\times G(x, y)$; after performing point add operation on the above initial point values, obtaining the mid-point value $Q=1\times2^8\times G(x, y)+1\times2^6\times G(x, y)+3\times2^4\times G(x, y)+1\times2^2\times G(x, y)$.

In Embodiment 3 of the present invention, by searching the preset initial point value table to obtain the initial point value from the initial point value table and performing computing according to the initial point value, the operation speed is greatly improved.

In other embodiments of the present invention, taking the packet with the most significant bit of binary data obtained by converting as current packet and determining whether the value of the current packet is 0, if yes, obtaining a packet which is next to and lower than the current packet from the binary data, updating the current packet with the packet and keeping on determining whether value of the current packet is 0 and performing subsequent operation; otherwise, obtaining a corresponding initial point value from the initial point value table according to the number and value of the current packet, performing point add operation on the obtained initial point value and a mid-point value, updating the mid-point value with result of the point add operation and determining whether the current packet is the least significant bit in the binary data obtained by converting, if yes, taking the mid-point value as generated coordinated points for outputting; otherwise, obtaining packet which is next to and lower than the current packet from the binary data obtained by converting; updating the current data bit with the packet and keeping determining whether the value of the current packet is 0 and performing subsequent operation.

In other embodiments of the present invention, it can also obtain the initial point value corresponding to the current packet from the initial point value directly without determining whether the value of the current packet is zero, performing point add operation on the obtained initial point value and the value of the current packet and performing point add operation according to the point multiplication result. For detailed process, please refer to Embodiment 4.

Embodiment 4

Figure 5:
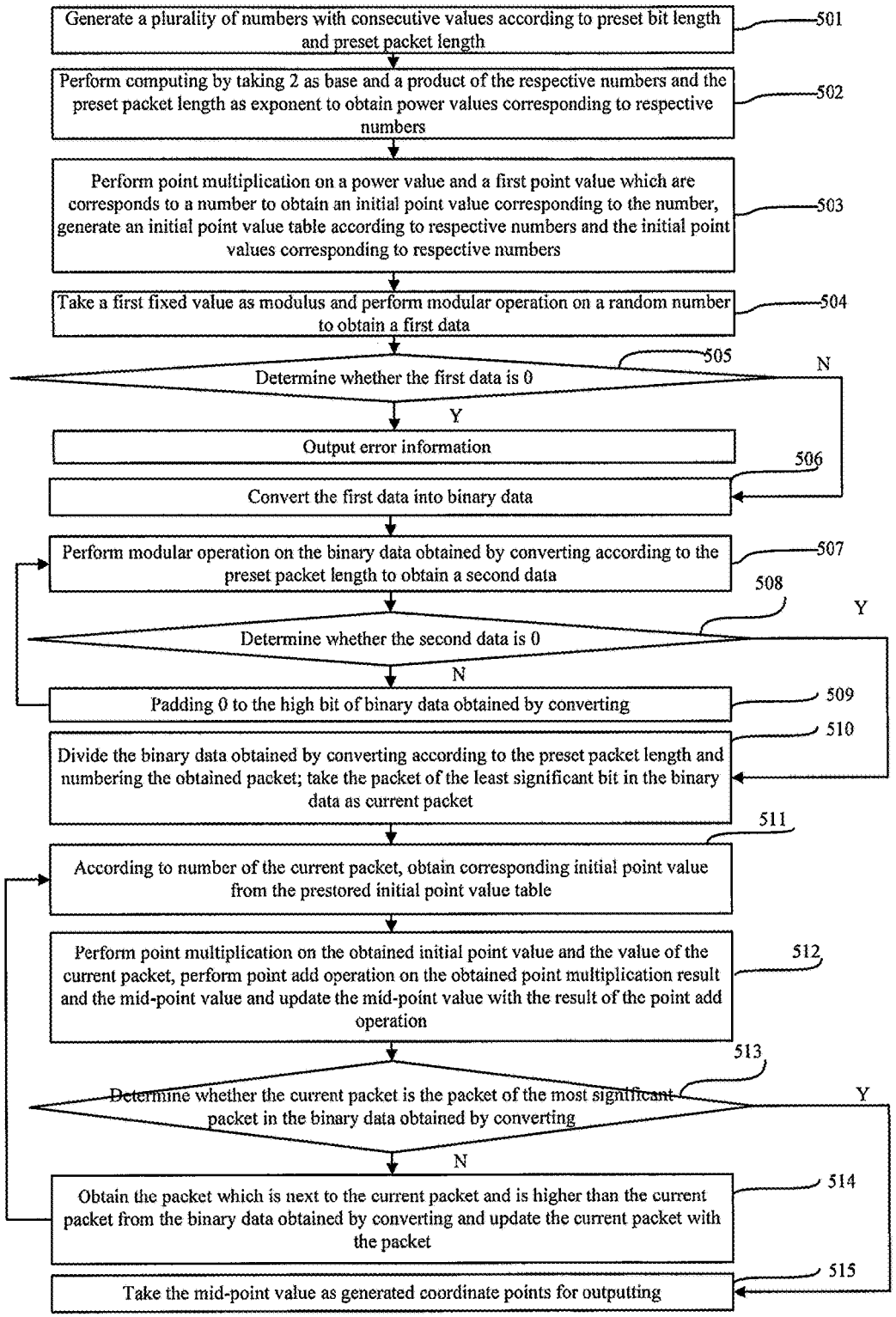
FIG. 5 is a flow chart of a method for generating coordinate points in an embedded system of Embodiment 4 of the present invention.

Embodiment 4 of the present invention provides a method for generating coordinate points in an embedded system. As shown by FIG. 5, the method includes following steps.

Figure 3:
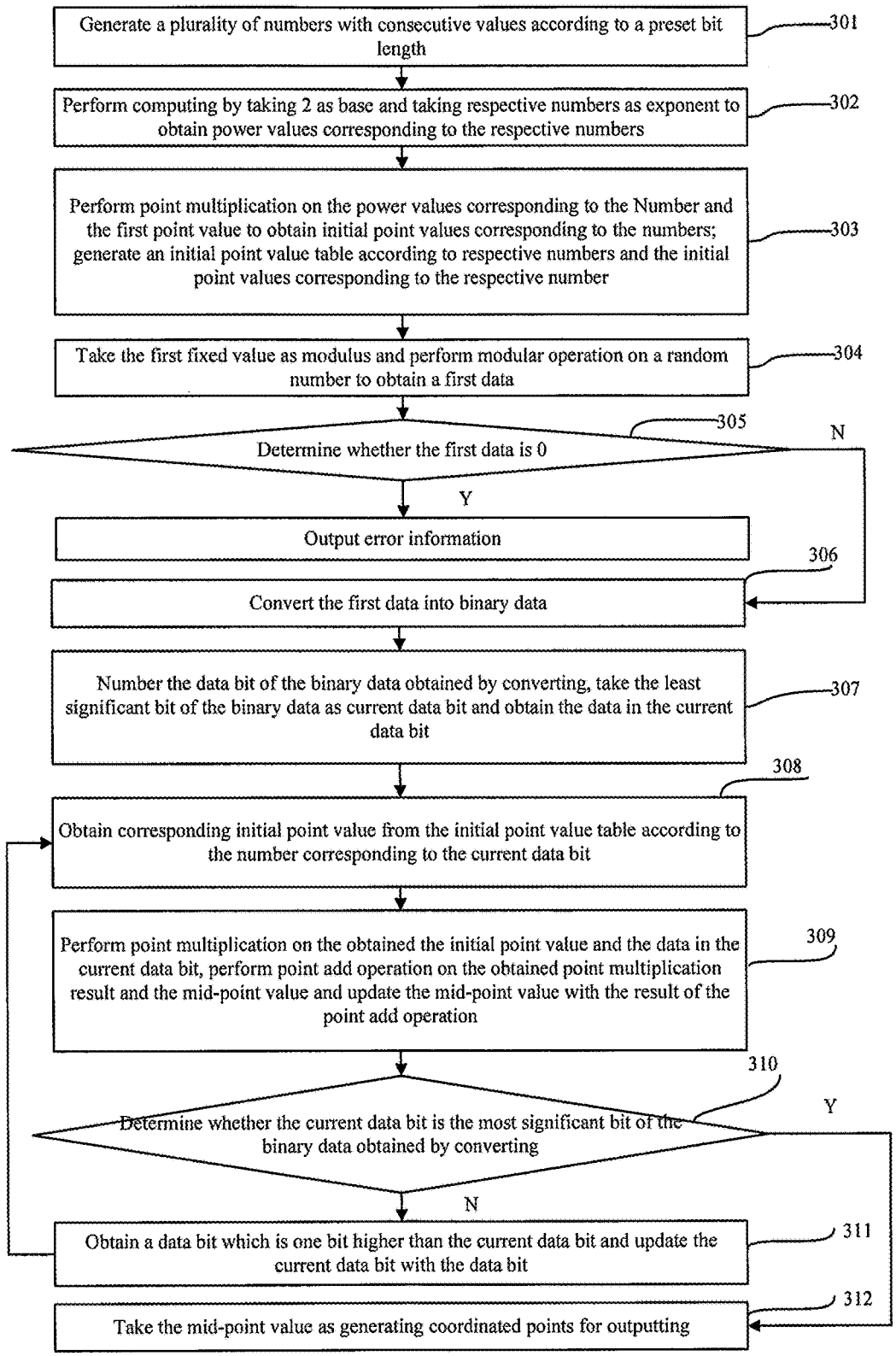
FIG. 3 is a flow chart of a method for generating coordinate points in an embedded system of Embodiment 2 of the present invention.

Step 501, generating a plurality of numbers with consecutive values according to preset bit length and preset packet length;

In this case, the number of numbers is ratio of the preset bit length and the preset packet length and the number with the minimum value is zero; For example, when the preset bit length is 10 bits and the preset packet length is 2, the number of the generated numbers is 5 and the numbers respectively are 4, 3, 2, 1, and 0;

Step 502, performing computing by taking 2 as base and products of the respective numbers and the preset packet length as exponents to obtain power values corresponding to respective numbers;

For example, when the numbers are 4, 3, 2, 1 and 0, the corresponding power values are respectively $2^8$, $2^6$, $2^4$, $2^2$ and $2^0$;

Step 503, performing point multiplication on a power value and a first point value which are correspond to a number to obtain an initial point value corresponding to the number, generating an initial point value table according to respective numbers and the initial point values corresponding to respective numbers;

In this case, the initial point value table includes a plurality of numbers and the initial point values corresponding to the numbers; when the preset packet length is n, the initial point value corresponding to number i is $2^{i*n}\times G(x, y)$; $G(x, y)$ is a preset first point value;

For example, when the power values corresponding to numbers 4, 3, 2, 1 and 0 are $2^8$, $2^6$, $2^4$, $2^2$ and $2^0$, after performing point multiplication, obtaining initial point values corresponding to respective numbers; the initial point values are $G_4=2^8\times G(x, y)$, $G_3=2^6\times G(x, y)$, $G_2=2^4\times G(x, y)$, $G_1=2^2\times G(x, y)$ and $G_0=2^0\times G(x, y)$; the generated initial point value table is shown as FIG. 3.

TABLE 3

| Example 3 of the initial point value table | | | | | |
|---|---|---|---|---|---|
| Number | 4 | 3 | 2 | 1 | 0 |
| Initial point value | $G_4$ | $G_3$ | $G_2$ | $G_1$ | $G_0$ |

Step 504, taking a first fixed value as modulus and performing modular operation on a random number to obtain a first data;

Step 505, determining whether the first data is 0, if yes, outputting error information; otherwise, going to Step 506;

Step 506, converting the first data into binary data;

In Embodiment 4, if the first data is 372, converting the first data 372 into binary data with 9 bits, i.e. 101110100;

It should be noted that Step 506 is preferable step; when the first data is binary data, it need not convert the first data into binary data, which can implement the purpose of the present invention as well.

Step 507, performing modular operation on the binary data obtained by converting according to the preset packet length to obtain a second data;

Step 508, determining whether the second data is 0, if yes, going to Step 510; otherwise, going to Step 509;

In Embodiment 4, if the first data is 372, converting the first data 372 into binary data with 9 bits 101110100; if the preset packet length is 2, the second data is 1;

Step 509, padding 0 to the high bit of binary data obtained by converting and going back to Step 507;

In Embodiment 4, if the preset packet length is 2, the first data is 372; converting the first data into binary data with 9 bits, i.e. 101110100; performing modular operation on 9 with 2 to obtain the second data 1; padding 0 before 101110100 to obtain binary data 0101110100 with 10 bits; the second data obtained by performing modular operation on 10 with 2 is 0;

Step 510, dividing the binary data obtained by converting according to the preset packet length and numbering the obtained packet; taking the packet of the least significant bit in the binary data as current packet;

In Embodiment 4, according to order from low bit to high bit by starting from 0, numbering the packets obtained by dividing the binary data according to the preset packet length; in this case, the bit length of the packet is preset packet length. For example, the preset packet length is 2; the binary data is 0101110100; the packets obtained by dividing are, as in order from high to low, "01", "01", "11", "01" and "00"; the corresponding numbers are respectively 4, 3, 2, 1 and 0; taking the packet "00", which is numbered 0, as current packet;

Step 511, according to number of the current packet, obtaining corresponding initial point value from the pre-stored initial point value table;

For example, when the binary data obtained by converting the first data is 101110100 and the number of the current packet is 1, the obtained initial point value is $G_1=2^2 \times G(x, y)$;

Step 512, performing point multiplication on the obtained initial point value and the value of the current packet, performing point add operation on the obtained point multiplication result and the mid-point value and updating the mid-point value with the result of the point add operation;

In this case, the initial point value of the mid-point value is (0,0); for example, the binary data obtained by converting the first data is 101110100; if the number corresponding to the current packet is 2, the obtained corresponding initial point value is $G_1=2^2 \times G(x, y)$; performing point multiplication operation on the initial point value and the value of the current packet to obtain the updated point multiplication result $1 \times 2^2 \times G(x, y)$; performing point add operation on the point multiplication result and the mid-point value (0,0) so as to obtain the updated mid-point value $2^2 \times G(x, y)$; for detailed process of performing point add operation on the obtained point multiplication result and the mid-point value, please refer to Step 201 to Step 207 of FIG. 2.

Step 513, determining whether the current packet is the packet with the most significant packet in the binary data obtained by converting, if yes, going to Step 515; otherwise, going to Step 514;

Step 514, obtaining the packet which is next to and higher than the current packet from the binary data obtained by converting and updating the current packet with the packet, going back to Step 511;

Step 515, taking the mid-point value as generated coordinate points for outputting; For example, when the binary data obtained by converting the first data is 101110100, the obtained mid-point value is $Q=1 \times 2^8 \times G(x, y)+1 \times 2^6 \times G(x, y)+3 \times 2^4 \times G(x, y)+1 \times 2^2 \times G(x, y)+0 \times 2^0 \times G(x, y)$.

In Embodiment 4 of the present invention, by generating the initial point value table according to the preset bit length and the preset packet length, searching the initial point value table and obtaining the initial point value from the initial point value table and performing computing according to the initial point value, operation speed is improved greatly.

Embodiment 5

Embodiment 5 of the present invention provides a method for generating coordinate points in an embedded system. As shown by FIG. 5, the method includes following steps.

Step 601, obtaining a random number and a first fixed value; performing modular operation on the random number by taking the first fixed value as modulus to obtain a first data.

For example, the first data is binary data 101110100.

Step 602, selecting an unprocessed data bit from the first data;

Step 603, determining whether data in the selected data bit is zero, if yes, going to Step 606; otherwise, going to Step 604.

Step 604, according to the position of the selected data bit in the first data, obtaining an initial point value corresponding to the selected data bit from the pre-stored initial point value table.

In this case, respective initial point values in the initial point value table are results of performing point multiplication operation on different power values and a preset first point value $G(x, y)$; the power value can be $2^i$; i includes elements in a consecutive integer sequence including zero; the sequence is limited sequence.

Specifically, it can also obtain an initial point value with corresponding size from the initial point value table according to the position of the selected data bit in the first data. For example, the selected data bit is the zeroth bit, i.e. when the selected data bit is the least significant bit, the corresponding initial point value is the initial point value with the minimum value in the initial point value table, i.e. $2^0 \times G(x, y)$; when the selected data bit is the first bit, corresponding initial point value is $2^1 \times G(x, y)$.

When the initial point value table includes a plurality of numbers and initial point values corresponding to respective numbers, it can determine the number corresponding to the selected data bit in the initial point table according to the position of the selected data bit in the first data and take the initial point value corresponding to the number as the initial point value corresponding to the selected data bit. For example, the initial point value table is shown as Table 1 and the selected data bit is the zeroth bit; then the corresponding number is 0 and the corresponding initial point value is $G_0$; the selected data bit is the first bit, then the corresponding number is $G_1$.

Step 605, performing point add operation on the obtained initial point value and the mid-point value to obtain operation result and updating the mid-point value with the operation result.

In this case, the initial point value of the mid-point value is (0, 0).

Step 606, determining whether an unprocessed data bit exists in the first data, if yes, going back to Step 602; otherwise, going back to Step 607.

Step 607, taking the mid-point value as result data for outputting.

In Embodiment 5, when the first data is 101110100, the obtained initial point value is $G_8=2^8 \times G(x, y)$, $G_6=2^6 \times G(x, y)$, $G_5=2^5 \times G(x, y)$, $G_4=2^4 \times G(x, y)$, $G_2=2^2 \times G(x, y)$. After performing point add operation orderly, the obtained result data is $Q=1 \times 2^8 \times G(x, y)+1 \times 2^6 \times G(x,y)+1 \times 2^5 \times G(x, y)+1 \times 2^4 \times G(x, y)+1 \times 2^2 \times G(x, y)$.

In the embodiment of the present invention, by searching the pre-stored initial point value table to obtain the initial point values from the initial point value table and performing computing according to the initial point value, operation speed is improved greatly.

Embodiment 6

Figure 6:
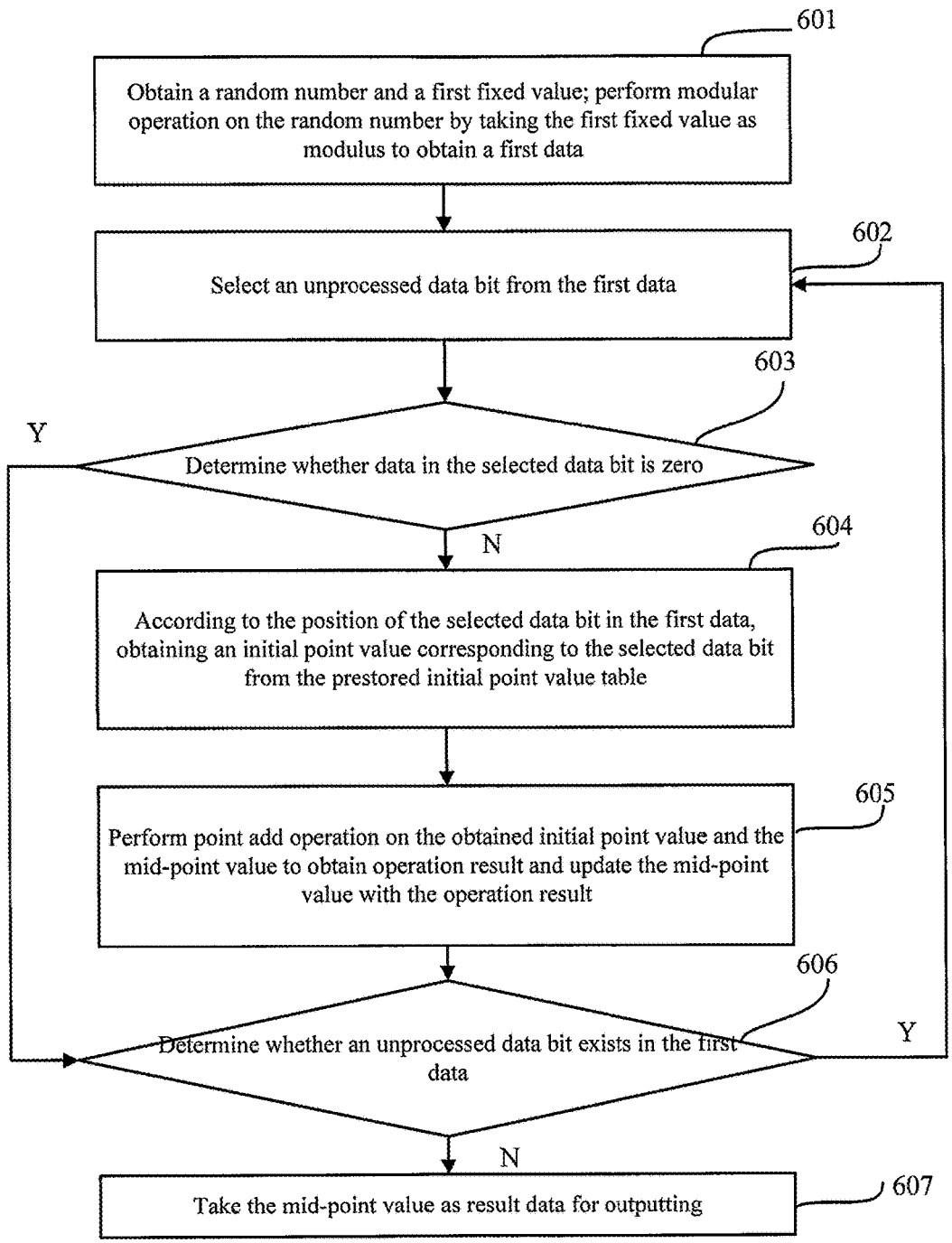
FIG. 6 is a flow chart of a method for generating coordinate points in an embedded system of Embodiment 5 of the present invention.
Figure 7:
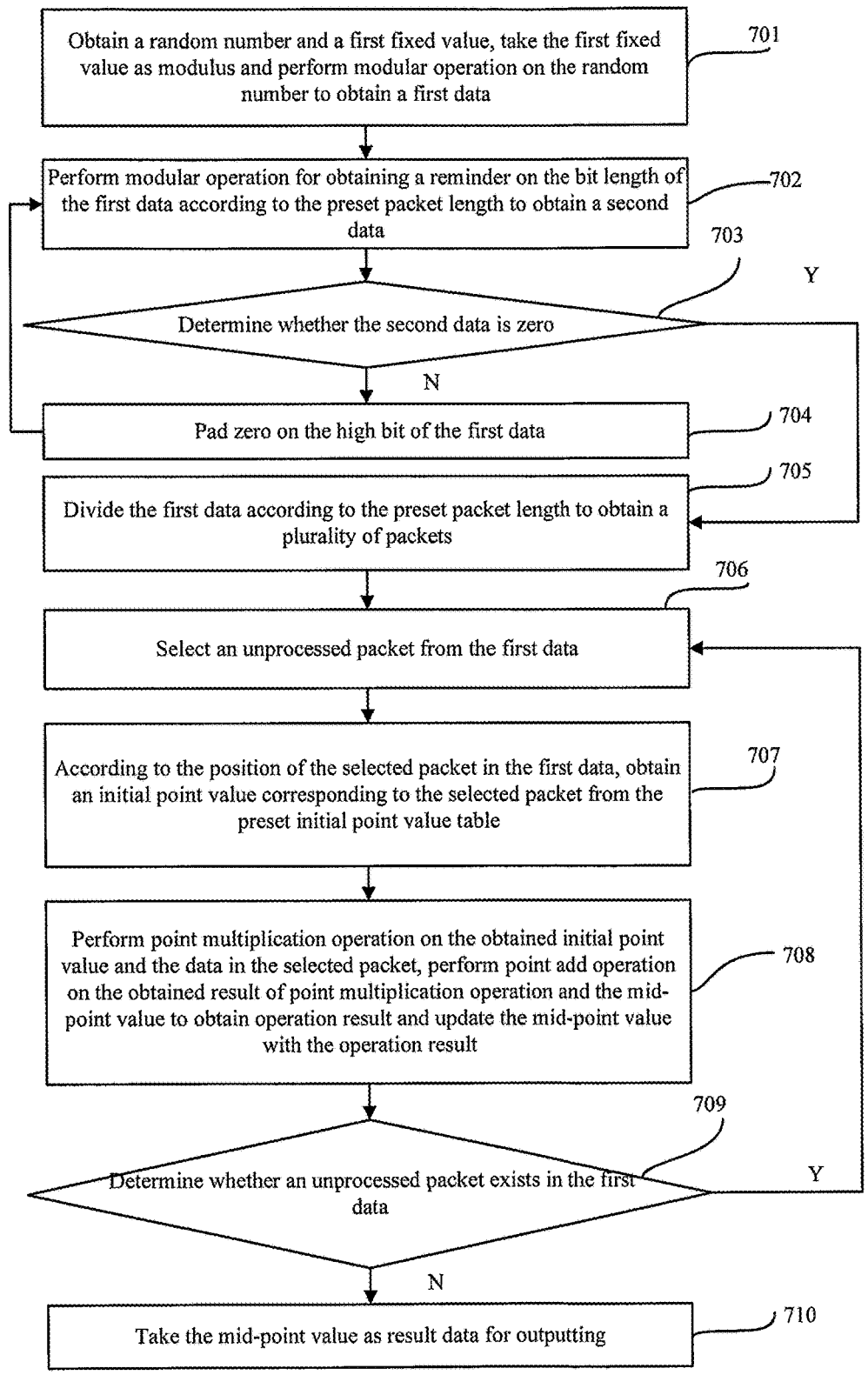
FIG. 7 is a flow chart of a method for generating coordinate points in an embedded system of Embodiment 6 of the present invention.

Embodiment 6 of the present invention provides a method for generating coordinate points in an embedded system. As shown by FIG. 6, the method includes following steps:

Step 701, obtaining a random number and a first fixed value, taking the first fixed value as modulus and performing modular operation on the random number to obtain a first data.

For example, the first data is binary data 101110100 and the bit length is 9.

Step 702, performing modular operation for a reminder on the bit length of the first data according to the preset packet length to obtain a second data.

Step 703, determining whether the second data is zero, if yes, going to Step 705; otherwise, going to Step 704.

Step 704, padding zero to the high bit of the first data, going back to Step 702.

For example, when the preset packet length is 2, the first data after padding zero is 0101110100.

Step 705, dividing the first data according to the preset packet length to obtain a plurality of packets.

For example, the packets obtained by dividing are "01", "01", "11", "01" and "00".

Step 706, selecting an unprocessed packet from the first data.

Step 707, according to the position of the selected packet in the first data, obtaining an initial point value corresponding to the selected packet from the pre-stored initial point value table.

In this case, respective initial point values in the initial point value table are operation results obtained by performing point multiplication operation on different power values and the preset first point value $G(x, y)$; the power value can be $2^{i*n}$, i includes elements in a consecutive integer sequence including zero. The sequence is limited sequence and n is the preset packet length.

Specifically, it can obtain an initial point value with corresponding value from the initial point table according to the position of the selected data bit in the first data. For example, the selected data bit is the zeroth bit, i.e. when the selected data bit is low bit, the corresponding initial point value is the initial point value with the minimum value in the initial point value table, i.e. $2^{0*2} \times G(x, y)$; when the selected data bit is the first bit, the corresponding initial point value is $2^{1*2} \times G(x,y)$.

Step 708, performing point multiplication operation on the obtained initial point value and the data in the selected packet, performing point add operation on the obtained result of the point multiplication operation and the mid-point value to obtain operation result and updating the mid-point value with the operation result.

In this case, the initial point value of the mid-point value is (0, 0).

Step 709, determining whether an unprocessed packet exists in the first data, if yes, going back to Step 706; otherwise, going to Step 710.

Step 710, taking the mid-point value as result data for outputting.

In Embodiment 6, when the first data is 101110100, the obtained initial point value is $2^8 \times G(x, y)$, $2^6 \times G(x, y)$, $2^4 \times G(x, y)$, $2^2 \times G(x, y)$ and $2^0 \times G(x, y)$; after performing point add operation orderly, obtaining the result data $$Q = 1 \times 2^8 \times G(x,y) + 1 \times 2^6 \times G(x,y) + 3 \times 2^4 \times G(x,y) + 1 \times 2^2 \times G(x,y) + 0 \times 2^0 \times G(x,y).$$

In the embodiment of the present invention, according to the position of the selected packet in the first data, by searching the pre-stored initial point value table to obtain the initial point value from the initial point value table and performing computing according to the initial point value and the data of the selected packet, operation speed is improved greatly.

Combining with the step of Embodiment disclosed by the present invention, the method can be implemented by hardware, software module executed by a processor or combination of hardware and the software module. The software module can be arranged in Random Access Memory (RAM), memory, Read-Only Memory (ROM), Electric Programmable ROM, Electric Erasable Programmable ROM, register, hardware disk, mobile disk, CD-ROM, or storage media in any other forms known in the prior art.

What described above is only specifically embodiments of the present invention. However, the scope of protection of the present invention is not limited to the embodiments of the present invention, any change or substitution which is easily though of should fall in the scope of protection of the present invention. Therefore, the scope of protection of the present invention should be defined by the appended claims.

The invention claimed is:

1. A method of encrypting or signing in an embedded system using coordinate points as a basis for a key generated from a computer aided process, the embedded system having a computer readable medium, wherein the steps are executed in the computer readable medium, comprising the steps of:
    S1, obtaining a random number and a first fixed value, taking the first fixed value as modulus, and performing modular operation on the random number by the embedded system, so as to obtain a first data;
    S2, selecting an unprocessed data bit from the first data by the embedded system;
    S3, obtaining an initial point value corresponding to the selected data bit from a pre-stored initial point value table according to the position of the selected data bit in the first data by the embedded system; respective initial point values in the initial point value table are operation results of performing point multiplication operation respectively on different power values with a preset first point value;
    S4, performing point multiplication on the obtained initial point value with the data in the selected data bit by the embedded system; performing point add operation on the obtained point multiplication result with a mid-point value by the embedded system, so as to obtain a point add operation result by the embedded system; and updating the mid-point value with the point add operation result; the initial point value of the mid-point value is (0, 0);
    S5, determining whether any unprocessed data bit exists in the first data by the embedded system, if yes, going back to Step S2; otherwise, going to Step S6; and
    S6, outputting the mid-point value as result data by the embedded system;
    using the result data to generate the key by the embedded system;
    using the key to complete encrypting or signing into the embedded system,
    said method uses the computer generated coordinate points to generate a key, and the key in turn controls access to a computer.

2. The method of claim 1, wherein the initial point value table is generated according to the following way:
    generating a plurality of consecutive integers including zero according to a preset bit length;
    computing by taking 2 as base and taking respective integers as exponents so as to obtain power values corresponding to respective integers;
    performing point multiplication operation on the power values corresponding to respective integers with the first point value so as to obtain the initial point value table comprising a plurality of initial point values.

3. The method of claim 1, wherein the initial point value table is generated according to the following way:
    generating a plurality of consecutive numbers comprising zero according to preset bit length;
    computing by taking 2 as base and taking respective numbers as exponents so as to obtain power values corresponding to respective numbers;

performing point multiplication on the power values corresponding to respective numbers with the first point value so as to obtain the initial point values corresponding to respective numbers, and generating the initial point value table according to the respective numbers and the initial point values corresponding to respective numbers.

4. The method of claim 3, wherein obtaining an initial point value corresponding to the selected data bit from a pre-stored initial point value table according to the position of the selected data bit in the first data, specifically comprises:
determining a number, which corresponds to the selected data, from the initial point value table according to the position of the selected data bit in the first data; and
taking the initial point value corresponding to the number as the initial point value corresponding to the selected data.

5. The method of claim 3, wherein before selecting an unprocessed data bit from the first data, the method further comprises:
numbering the data bits of the first data according to order from lower bit to higher bit; and
obtaining an initial point value corresponding to the selected data bit from the pre-stored initial point value table according to the position of the selected data bit in the first data, specifically comprises:
obtaining a corresponding initial point value from the pre-stored initial point value table according to the number of the selected data bit.

6. A method of encrypting or signing in an embedded system using coordinate points as a basis for a key generated from a computer aided process, the embedded system having a computer readable medium, wherein the steps are executed in the computer readable medium, comprising the steps of:
S1, obtaining a random number and a first fixed value, taking the first fixed value as modulus, and performing modular operation on the random by the embedded system, so as to obtain a first data;
S2, performing modular operation for a remainder on the bit length of the first data according to preset packet length by the embedded system, so as to obtain a second data;
S3, determining whether the second data is zero by the embedded system, if yes, going to Step S5; otherwise, going to Step S4;
S4, padding zero to the high bit of the first data by the embedded system; then going back to Step S2 by the embedded system;
S5, dividing the first data into packets according to the preset packet length by the embedded system, so as to obtain a plurality of packets;
S6, selecting an unprocessed packet from the first data by the embedded system;
S7, obtaining an initial point value corresponding to the selected packet from a pre-stored initial point value table according to the position of the selected packet in the first data by the embedded system; respective initial point values in the initial point value table are operation results of performing point multiplication operation respectively on different power values with a preset first point value;
S8, performing point multiplication on the obtained initial point value and the data in the selected data bit by the embedded system; performing point add operation on the obtained point multiplication result with a mid-point value so as to obtain point add operation result by the embedded system; and updating the mid-point value with the point add operation result by the embedded system; the initial point value of the mid-point value is (0, 0);
S9, determining whether any unprocessed packet exists in the first data by the embedded system, if yes, going back to Step S6; otherwise, going to Step S10; and
S10, taking the mid-point value as result data for outputting by the embedded system;
using the result data to generate the key by the embedded system;
using the key to complete encrypting or signing into the embedded system,
said method uses the computer generated coordinate points to generate a key, and the key in turn controls access to a computer.

7. The method of claim 6, wherein the initial point value table is generated in the following way:
generating a plurality of consecutive integers comprising zero according to preset bit length and the preset packet length;
computing by taking 2 as base and products of respective integers and the preset packet length so as to obtain power values corresponding to respective integers;
performing point multiplication on power values corresponding to respective integers with the first point value so as to obtain the initial point value table comprising a plurality of initial point value.

8. The method of claim 6, wherein the initial point value table is generated by following way:
generating a plurality of consecutive numbers comprising zero according to preset bit length and the preset packet length;
computing by taking 2 as base and taking products of respective numbers and the preset packet length as exponents so as to obtain power values corresponding to respective numbers;
performing point multiplication on the power values corresponding to respective numbers with the first point value so as to obtain the initial point values corresponding to respective numbers and generating the initial point value table according to the respective numbers and the initial point values corresponding to respective numbers.

9. The method of claim 8, wherein obtaining an initial point value corresponding to the selected packet from a pre-stored initial point value table according to the position of the selected packet in the first data, specifically comprises:
determining a number, which corresponds to the selected packet, from the initial point value table according to the position of the selected packet in the first data;
taking the initial point value corresponding to the number as the initial point value corresponding to the selected data.

10. The method of claim 8, wherein before selecting an unprocessed packet, the method further comprises:
numbering the packets obtained by dividing the first data according to order from lower bit to higher bit; and
obtaining an initial point value corresponding to the selected packet from the pre-stored initial point value table according to the position of the selected packet in the first data, specifically comprises:

obtaining a corresponding initial point value from the pre-stored initial point value table according to the number of the selected packet.

* * * * *